Jan. 3, 1961   M. SUBEN   2,967,077
BRACKET MOUNTING FOR COLLAPSIBLE TABLES OR SHELVES
Filed Dec. 15, 1958
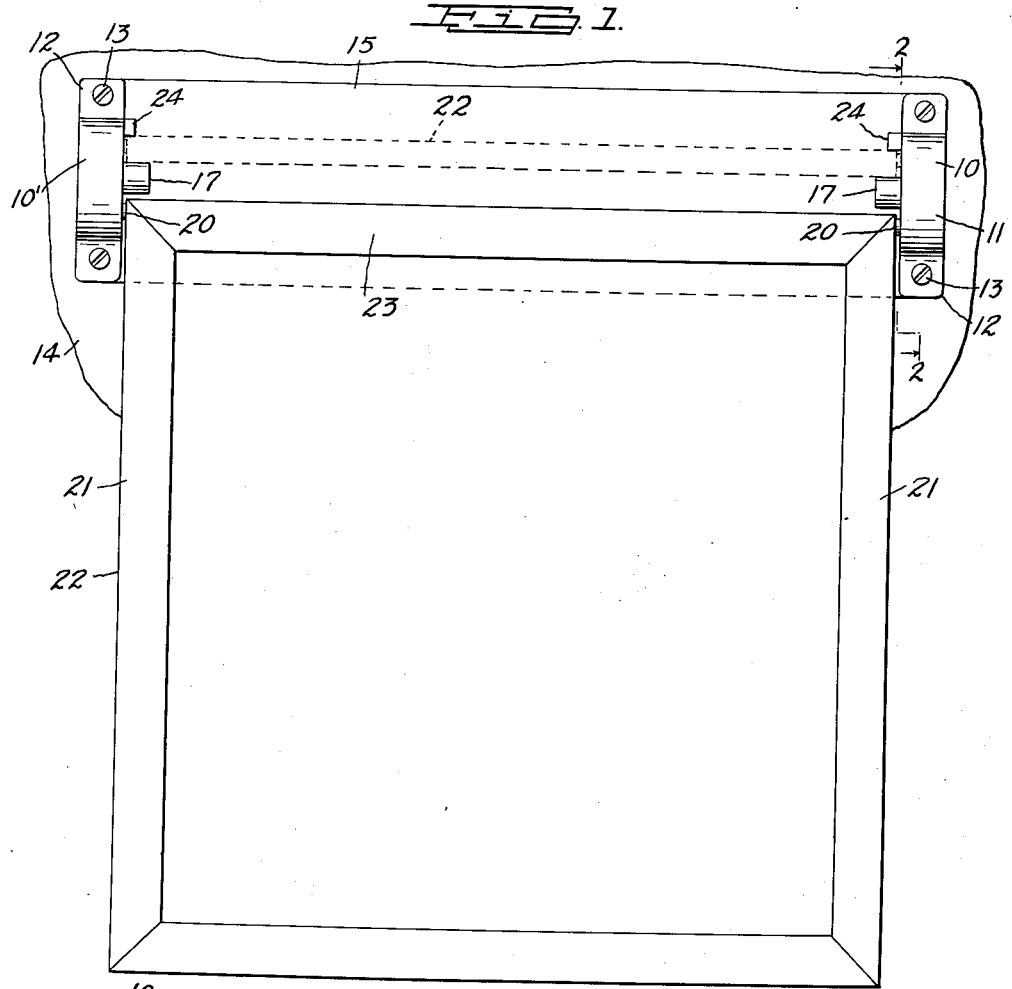
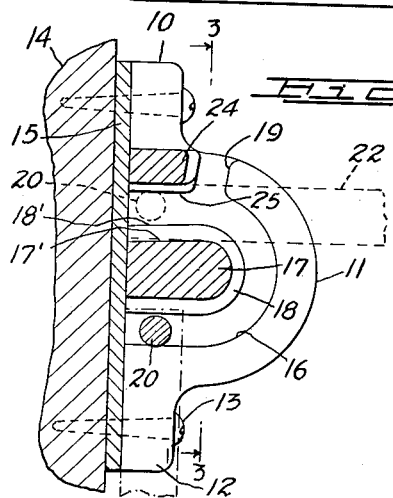
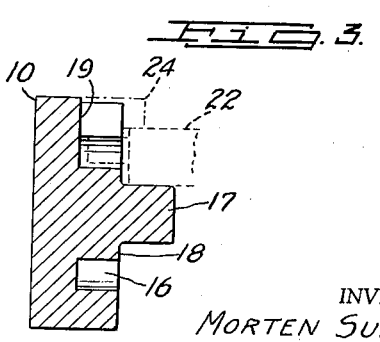
INVENTOR.
MORTEN SUBEN
BY
Howard E. Thompson
ATTORNEY

United States Patent Office 2,967,077
Patented Jan. 3, 1961

2,967,077

BRACKET MOUNTING FOR COLLAPSIBLE TABLES OR SHELVES

Morten Suben, 465 E. Lincoln Ave., Mount Vernon, N.Y., assignor of one-half to Max Caplan, East Hills, N.Y.

Filed Dec. 15, 1958, Ser. No. 780,348

7 Claims. (Cl. 311—19)

This invention relates to a bracket-type structure for mounting a board, table or the like in connection with a supporting wall in such manner as to permit collapsing of the table or the like into a position adjacent and paralleling the wall, as well as to support the table in an extended position at right angles to the wall.

More particularly, the invention deals in two channelled bracket members fashioned to receive pin pivot ends of a table or the like, with means on the brackets for supporting the table or the like in horizontal position, the brackets including extending flange portions overlying the table top in bracing the pivotal end portion of the table when in horizontal position.

Still further, the brackets include means for detachably coupling the shelf or the like therewith.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a face view of a bracket structure made according to my invention, indicating a table supported therein in collapsed position in full lines and in extended position in dotted lines and indicating part of a wall structure.

Fig. 2 is an enlarged section on the line 2—2 of Fig. 1; and

Fig. 3 is a section on the line 3—3 of Fig. 2.

In carrying my invention into effect, I provide two similar, but righthand and lefthand, brackets 10, 10' and, as these brackets have identical construction in other respects, the brief description of one will apply to both and like references will identify like parts, the bracket 10 being shown in detail in Figs. 2 and 3 of the drawing.

Each bracket includes an enlarged central portion 11 terminating in apertured, flanged ends 12 for reception of screws or other fastening devices 13 in attaching the brackets to a supporting wall, indicated, in part, at 14. In the present construction, the brackets are arranged upon and spaced by a spacing strip or plate 15, also apertured, at its end, to receive the screws 13 and this plate definitely alines and spaces the brackets one with respect to the other.

The enlarged portion 11 of each bracket has a deep U-shaped channel or recess 16, within which is a bearing portion 17, which protrudes beyond the recess surface of the bracket, as clearly noted in Figs. 1 and 3 of the drawing The inner surfaces of the channel 16 are bordered by a wall 18 extending around the bearing portion or member 17 and flush with the channelled surface of the bracket, as is clearly noted in Fig. 3 of the drawing.

The upper surface of the bearing member 17 is inclined downwardly and inwardly to a slight extent, as indicated at 17' in Fig. 2 of the drawing, and the surface of the wall 18 is correspondingly inclined, as indicated at 18'. The boundary wall of the channel or recess 16 has, at the upper portion of the bracket beyond the limit of the flange 12, a discharge aperture 19 of sufficient size to clear the projecting pivot pins 20 at sides 21 of a shelf, table or the like 22, the pins being arranged adjacent the outer surface of the end 23 of the shelf or table, as clearly noted in Fig. 1 of the drawing. The end 23 can be defined as the inner end of the table, as it is the end which maintains a position adjacent the wall 14. By providing the apertures 19, the entire shelf or table can be detached from the brackets and used as a tray or portable table.

The surface of each bracket, adjacent the aperture 19, has an inwardly projecting bearing flange 24, forming a supplemental bearing portion adapted to engage the upper surface of the shelf or table 22 when the latter is supported in the operative or horizontal position, as is clearly noted in dotted lines in Figs. 1 and 2 of the drawing, and in dotted lines and dot-dash lines in Fig. 3. The lower surface of the table, when in horizontal position, rests upon the member 17 and the pivot pins bear upon the surface 25 of the channels 16 of each of the brackets.

When the shelf or table 22 is in its extended operable position, to collapse the same or move the same into the full line position of Fig. 1, all that is necessary is to pull outwardly on 22 until the upper curved portion of the channel 16 is reached; whereupon, the pins 20 will move down in the channel and then assume the position shown in full lines in Fig. 2, in which position, the shelf or table 22 will be supported in close proximity to the wall 14.

It will also appear that, when it is desired to detach the shelf or table from the brackets, the same will be pulled out to a point where the pins 20 are in alinement with the apertures 19; whereupon, the shelf is lifted upwardly and detachment is thus accomplished.

Having fully described my invention, what I claim as new and desire to secure by Letters Patent is:

1. A bracket structure for collapsible support of a table on a supporting wall, comprising a pair of similar spaced brackets, each bracket having an enlarged channelled portion, the channel of each bracket opening through one surface of the bracket and being U-shaped in form, the channelled portions being opposed to each other in mounting of the brackets on a supporting wall, the brackets having means for receiving fastening devices for attachment to a wall, a bearing member on each bracket within the environment of the channels and projecting beyond said surface, the table having, at opposed sides, pivot pins operating in the channels of the spaced brackets, and said pins engaging a wall of the channel of each bracket and the table engaging the bearing member of each bracket in support of the table in horizontal position.

2. A structure as defined in claim 1, wherein a boundary wall of the channel of each bracket has an aperture, through which the pivot pins of the table are free to pass in detaching the table from the brackets.

3. A structure as defined in claim 2, wherein adjacent surfaces of the spaced brackets have projecting bearing flanges operatively engaging upper surfaces of the horizontally supported table in reinforcing the support of the table in said horizontal position.

4. A structure as defined in claim 3, wherein a spacing strip is arranged between the brackets and the wall to which the brackets are attached for definitely spacing the brackets one with respect to the other.

5. A structure as defined in claim 1, wherein the inner wall of the channel of each bracket is defined by a wall bordering said bearing member.

6. A structure as defined in claim 5, wherein the upper surface of the bearing member and said last named wall is inclined.

7. A bracket of the character described, comprising an enlarged central channelled portion, the channel opening through one surface of the bracket and being U-shaped in form, the bracket having means for receiving fastener devices for the attachment of the bracket to a support, a bearing member on the bracket within the environment of the channel and projecting beyond said surface, a boundary wall of the channel having an aperture opening into the channel and outwardly through said wall, and the bracket beyond the limits of the channel including a protruding supplemental bearing surface.

References Cited in the file of this patent
UNITED STATES PATENTS

| | | |
|---|---|---|
| 996,908 | Craig | July 4, 1911 |
| 1,200,477 | Frantz | Oct. 10, 1916 |
| 1,236,237 | Vanek | Aug. 7, 1917 |
| 1,917,336 | Spitz | July 11, 1933 |
| 1,963,721 | Smith | June 19, 1934 |
| 2,514,703 | Lantz | July 11, 1950 |
| 2,757,893 | Merz | Aug. 7, 1956 |
| 2,873,155 | Suben | Feb. 10, 1959 |